(12) United States Patent
Tanaka

(10) Patent No.: US 8,243,307 B2
(45) Date of Patent: Aug. 14, 2012

(54) HTTP SERVER AND PROGRAM FOR TRANSMITTING REPORTS WITH CHUNKED DATA

(75) Inventor: Toshihiko Tanaka, Isehara (JP)

(73) Assignee: Konica Minolta Business Technolgies, Inc., Tokyo (JP)

( * ) Notice: Subject to any disclaimer, the term of this patent is extended or adjusted under 35 U.S.C. 154(b) by 1241 days.

(21) Appl. No.: 12/009,770

(22) Filed: Jan. 22, 2008

(65) Prior Publication Data

US 2008/0225329 A1    Sep. 18, 2008

(30) Foreign Application Priority Data

Mar. 12, 2007 (JP) ................. 2007-061340

(51) Int. Cl.
*G06F 15/00* (2006.01)
*G06F 3/12* (2006.01)
*G06K 1/00* (2006.01)

(52) U.S. Cl. ..................... 358/1.15; 358/1.14
(58) Field of Classification Search .......... None
See application file for complete search history.

(56) References Cited

U.S. PATENT DOCUMENTS 8,098,388 B2 *   1/2012   Suzuki et al. .............. 358/1.15

FOREIGN PATENT DOCUMENTS

| JP | 2000-148416 A | 5/2000 |
|----|---------------|--------|
| JP | 2004-208266 A | 7/2004 |
| JP | 2004-364083 A | 12/2004 |
| JP | 2005-26971 A  | 1/2005 |
| JP | 2006-159509 A | 6/2006 |
| JP | 2006-520137 A | 8/2006 |

OTHER PUBLICATIONS

Japanese "Office Action", dated Dec. 11, 2008, for counterpart Japanese Patent Application No. 2007-061340; Together with an English-translation thereof.

* cited by examiner

*Primary Examiner* — Douglas Tran
(74) *Attorney, Agent, or Firm* — Buchanan Ingersoll & Rooney PC

(57) ABSTRACT

An HTTP server including a communication section which communicates with a client, and a control section which, as a response to an HTTP request for requesting a report pertaining to a monitoring object received from the client via the communication section, transmits the report via the communication section to the client by making the report with chunked data in chunked transfer coding, upon a change of the monitoring object occurs.

8 Claims, 10 Drawing Sheets

HTTP SERVER AND PROGRAM FOR TRANSMITTING REPORTS WITH CHUNKED DATA

CROSS-REFERENCE TO RELATED APPLICATION

The present application is based on Japanese Patent Application No. 2007-061340 filed with Japanese Patent Office on Mar. 12, 2007, the entire content of which is hereby incorporated by reference.

BACKGROUND OF THE INVENTION

1. Technical Field

The present invention relates to an HTTP server compatible with a chunked transfer coding and a computer readable medium storing a program therefor.

2. Description of Related Art

As on of the responses to an HTTP (Hypertext Transfer Protocol) request, there is a response by chunked transfer coding, the detail of which is defined by Hypertext Transfer Protocol, RFC (Request for Comments) 2616 of HTTP/1.1. The chunked transfer coding is a transfer coding for dividing data into several chunks as a response to the HTTP request.

For example, Unexamined Japanese Patent Application Publication No. 2004-208266 discloses a technology for transferring chunked tile parts of the JPEG 2000 compliant codestream.

Conventionally, in case of inquiring the server about the job status in a printer on the network, a connection is initiated from the client to the server to request the status of the printer or the job. Then, the server returns a single status report to the client, and disconnects or terminates the communication thereafter. Thus, if the client attempts to successively or cyclicly acquire the status of the printer, a series of operations, each including the initiation of the connection, the transmission of the request, the response to the request, and the termination, are required. In this method, there have been problems that: a communication overhead is large; the process load increases in both a server and a client; and a mismatch may occur between the actual status in the printer and the status comprehended on the client side, depending on the length of the transmission cycle of the request for the status report.

For example, in FIG. 10, a notification of job list is requested (Req) by connecting from a client to a printer controller having a server function. As the response (Res) to the request, the job list is replied one time. Then the communication is terminated. The job list in the client side is updated by repeating the series of communication set H at a constant cycle.

In this example, since the communication sets H2 and H6 were conducted after the previous communication sets H1 and H5 had been conducted and before the job statuses of the printer controller side have changed, the communication sets H2 and H6 becomes useless communication sets having no new information to be notified to the client.

Further, from the time T1 when the response (Res) is transmitted from the printer controller to the client in the communication set H2 to the time T4 when the response (Res) is transmitted in the communication set H3, a job of ID3 is newly submitted at time T2 and the print of the first page is completed in the printer controller at time T3. Thus, the information when the job of ID3 was submitted is skipped without being displayed.

The times (T4, T6, T8 and T10), when the changes are reflected to the job list of the client side, delay from the times (T2, T3, T5, T7 and T9), when the job statuses have changed in the printer controller side, in a time-wise. In the delay period, the mismatch of the job statuses between the printer controller side and the client side exists.

The problems, such as a communication overhead being large, the process load increasing in both the server and the client; and a mismatch occurring between the statuses comprehended by the server side and the client side, may occur not only in the case where the client monitors the printer status but also in the cases of any monitoring objects.

SUMMARY

Therefore, it is an exemplary object of the present invention to provide an HTTP server and its program, which are capable of notifying the status of a monitoring object to client(s) with keeping a status match and less process and communication loads.

To achieve at least one of the abovementioned object and other objects being apparent or inferred from the present specification, an HTTP server reflecting one aspect of the present invention includes:

a communication section which communicates with a client, and a control section which, as a response to an HTTP request for requesting reports pertaining to a monitoring object received from the client via the communication section, transmits the reports via the communication section to the client by making the reports with chunked data in chunked transfer coding when changes occur to the monitoring object.

In the HTTP server, each report is preferably formed by information indicating difference between a previous status of the monitoring object, which has already been reported to the client, and a current status of the monitoring object.

In the HTTP server, a unique header and a unique footer are preferably added to data to be transmitted by the chunk.

Further, in the HTTP server, it is preferable that the change of the monitoring object is either a status change of a printing apparatus or a job state change of the printing apparatus.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

The exemplary embodiments of the present invention will be explained based on illustrations hereinafter.

Figure 1:
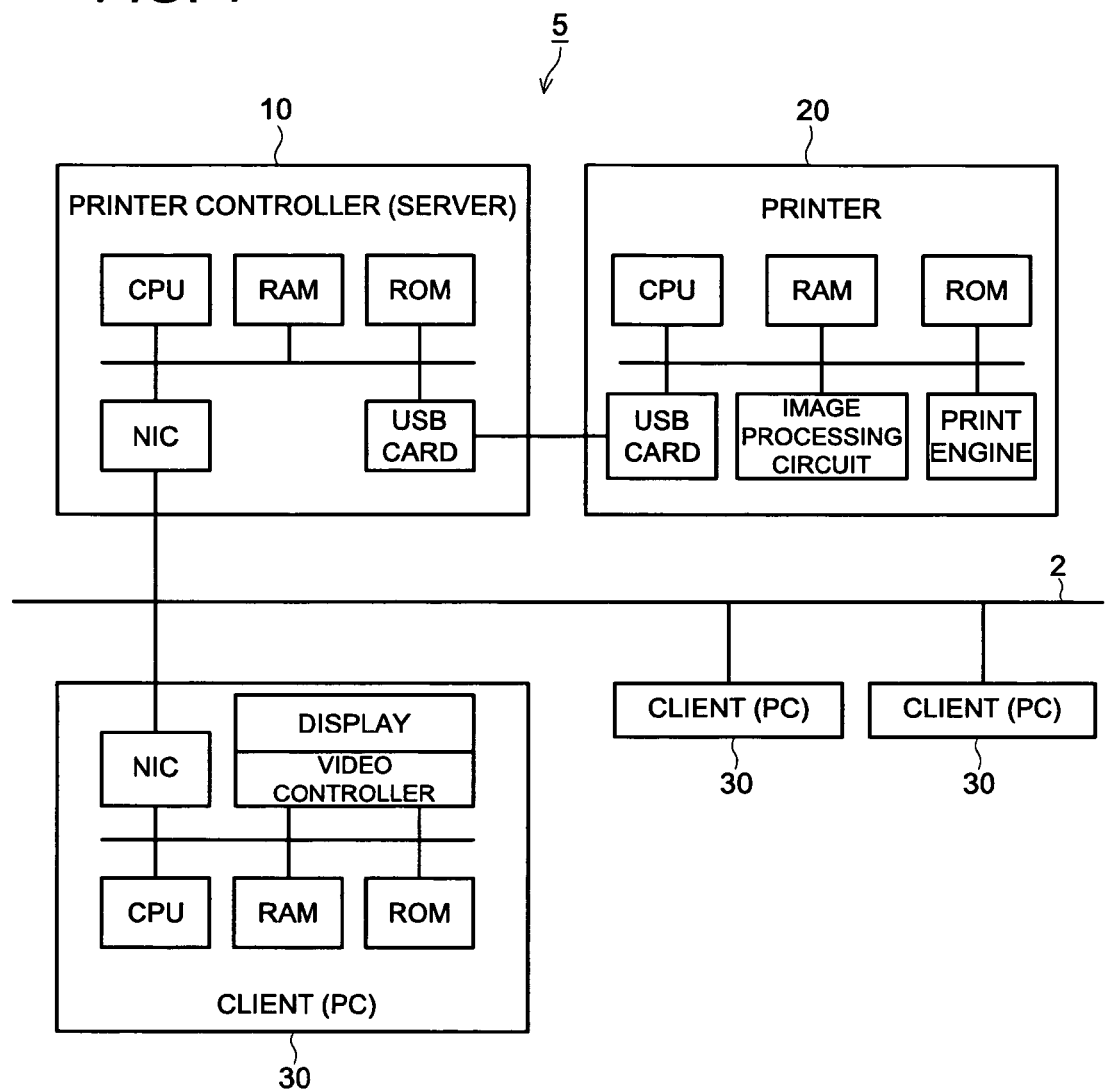
FIG. 1 illustrates a block diagram showing a schematic configuration of hardware of a server client system pertaining to an embodiment of the present invention.

FIG. 1 illustrates a block diagram showing a schematic configuration of hardware of a server-client system 5 pertaining to an embodiment of the present invention. A server-client system 5 is configured so that a printer controller 10 having a function as an H server and a client 30, which accesses to the printer controller 10, are connected to a network 2. Further, the printer controller 10 is locally connected to a printer 20.

The printer controller 10 is configured by a personal computer (PC) having a communication function. In detail, the printer controller 10 includes a CPU (Central Processing Unit) for managing the entire controller, a RAM (Random Access Memory) for temporarily storing various data, a ROM (Read Only Memory) for storing various programs, a NIC (Network Interface Card) for communicating with the client 30 via the network 2 and a USB (Universal Serial Bus) card for communicating with the printer 20 via a USB cable. Those mentioned above are connected to each other via a bus.

The printer includes a CPU for managing the entire controller, a RAM for temporarily storing various data, a ROM for storing various programs, an image processing circuit for operating an image process such as gradation correction, screening, and so on, to image data included in print data. Those mentioned above are connected to each other via a bus.

Further, the client 30 is configured by a PC having a communication function. Since the client 30 has the same configuration as the printer controller 10, except that the client 30 is connected to a display via a video controller, a redundant explanation will be omitted.

Figure 2:
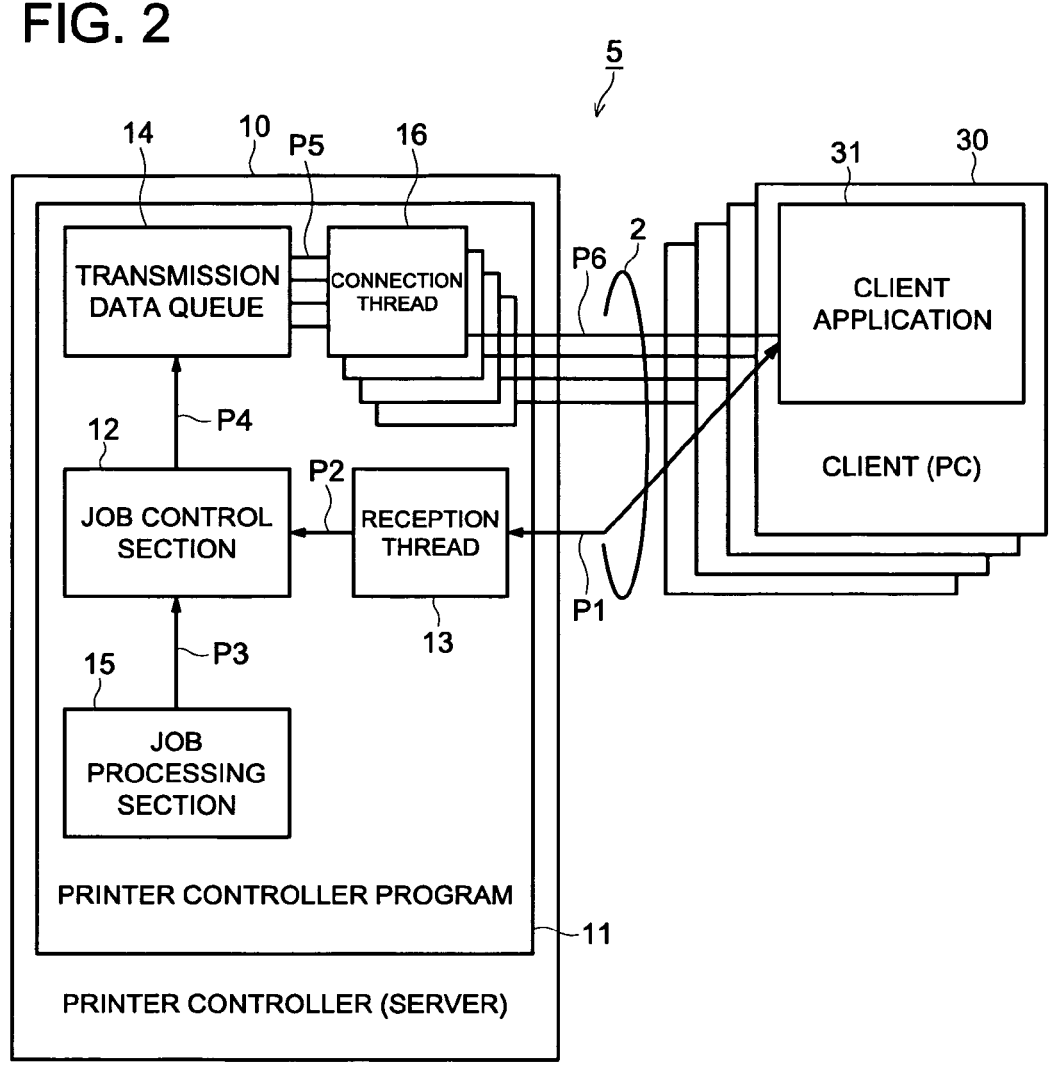
FIG. 2 illustrates a block diagram showing a schematic configuration of a function of a server client system pertaining to an embodiment of the present invention.

FIG. 2 illustrates a block diagram showing a schematic configuration of a function of a server-client system 5. The printer controller 10 receives a request of a print job from the client 30 through the networks 2. The printer controller 10 develops data in the print job into image data according to the request and conducts a control for allowing the printer to output an image corresponding to the image data. Further, the printer controller 10 has a function to receive from the client 30 an HTTP request for requesting a report (or reports) regarding statuses of the printer and print jobs, each of which is regarded as a monitoring object, and to send as a response to the HTTP request reports formed into a chunk (i.e., chunked data) of the chunked transfer coding to the client when changes occur to any one of the monitoring objects.

Further, the printer controller 10 attains the function mentioned above by the CPU executing a printer controller program 11 stored in the ROM. Meanwhile, the client 30 executes a program referred to as a client application 31. By executing the client application 31, a function for requesting a print job execution to the printer controller 10 (a function of a printer driver) and a function to display a list of requested jobs and statuses of jobs obtained from the printer controller 10 are attained.

The printer controller program 11, as an internal module, comprises a job control section 12 for managing a job queue that a common printer controller has, a reception thread 13 for accepting connections from the client applications 31, a transmission data queue 14 for buffering data to be transmitted to the client applications 31, a job processing section 15 for executing a requested job, and connection threads 16 for transmitting data by connecting with the client applications 30. Here, a plurality of the clients 30 can exist and can be connected to the connection threads 16 respectively provided for the clients 30.

The reception thread 13 is generated at the time of initialization of the printer controller program 11 and deleted when the printer controller program 11 ends. The reception thread 13 receives the HTTP request from the clients 30. There are two kinds of the HTTP request from the client 30, a connection request and a command. The connection request requests a start of a chunked transfer and the command is mainly used for operating a job (newly submitting and deleting a job, changing the order of priority, and canceling). The connection request is for a client 30 to request a report regarding statuses of the printer and print jobs, wherein each of the printer and the print jobs are regarded as a monitoring object for the printer controller 10. If the connecting request from the client 30 is received, the reception thread 13 generates a connection thread 16 for transmitting a response in chunked format to the client 30.

The client application 31 submits a connection request and a job operation command to the reception thread 13 through a connection P1 in between the reception thread 13 and the client application 31. The reception thread 13 responds to the client 30, through the connection PI, with Ack/Nack pertaining to the job operation command.

Further, a Request-URI is used to determine whether the HTTP request is the connection request or the command. Namely, the determination is made depending on different requesting resources of requested targets. For example, the first two lines of an HTTP request header of an acquisition command of job specific information is as follows.

GET/KM/MFP/100/JobInfoHTTP/1.1
Host: gentleman.msk.minolta.co.jp:1123

The first two lines of the HTTP request header of the connection request is as follows.

GET/KM/QueueInfoHTTP/1.1
Host: gentleman.msk.minolta.co.jp:1123

The job control section 12 manages a job queue for storing information of the jobs requested from the client application 13 in association with an execution order of the jobs. If there is a change in the job queue content, it is set promptly to notify of the detail of the change made (a report pertaining to a monitoring object) to the client as a response to the connection request. The job control section 12 receives from the reception thread 13 via a connection P2 the job operation command, which the reception thread 13 received from the client application 31. Further, the job control section 12 notifies the job processing section 15 of the job to be executed next through a connection P3 in between the job processing section 15 and the job control section 12 and notifies the job processing section 15 of the job operation (a cancellation and a pause of the job in the execution process).

The job processing section 15 executes job in response to the job operation notified by the job control section 12. Practically, the job processing section 15 conducts an operation for developing print data to the raster image (referred to as RIP (Raster Image Processor) hereinafter) and canceling and pausing of the job in the execution process. The job processing section 15 notifies the job control section 12 of a progress status through the connection P3. For example, the job processing section 15 notifies the job control section 12 of information on how far the RIP has processed, how many pages has been printed and if an error has occurred.

Further, the job control section 12 submits data to be returned to the client 30 to the transmission data queue 14 through a connection P4. Here, data to be transmitted to the client 30 with chunked transfer coding as a response to the connection request are submitted.

The connection thread 16, which is generated by the reception thread 13 if the reception thread 13 receives the connection request, is connected one-to-one to the client 30 being a transmission source of the connection request. The connection thread 16 determines whether there are data in the transmission data queue 14 or not. If there are data in the transmission data queue 14, the connection thread 16 retrieves data from the transmission data queue 14 through a connection P5 and functions to transmit the data as one chunk of the chunked transfer coding, to the client through connection P6.

Next, an operation of each module is explained.

Figure 3:
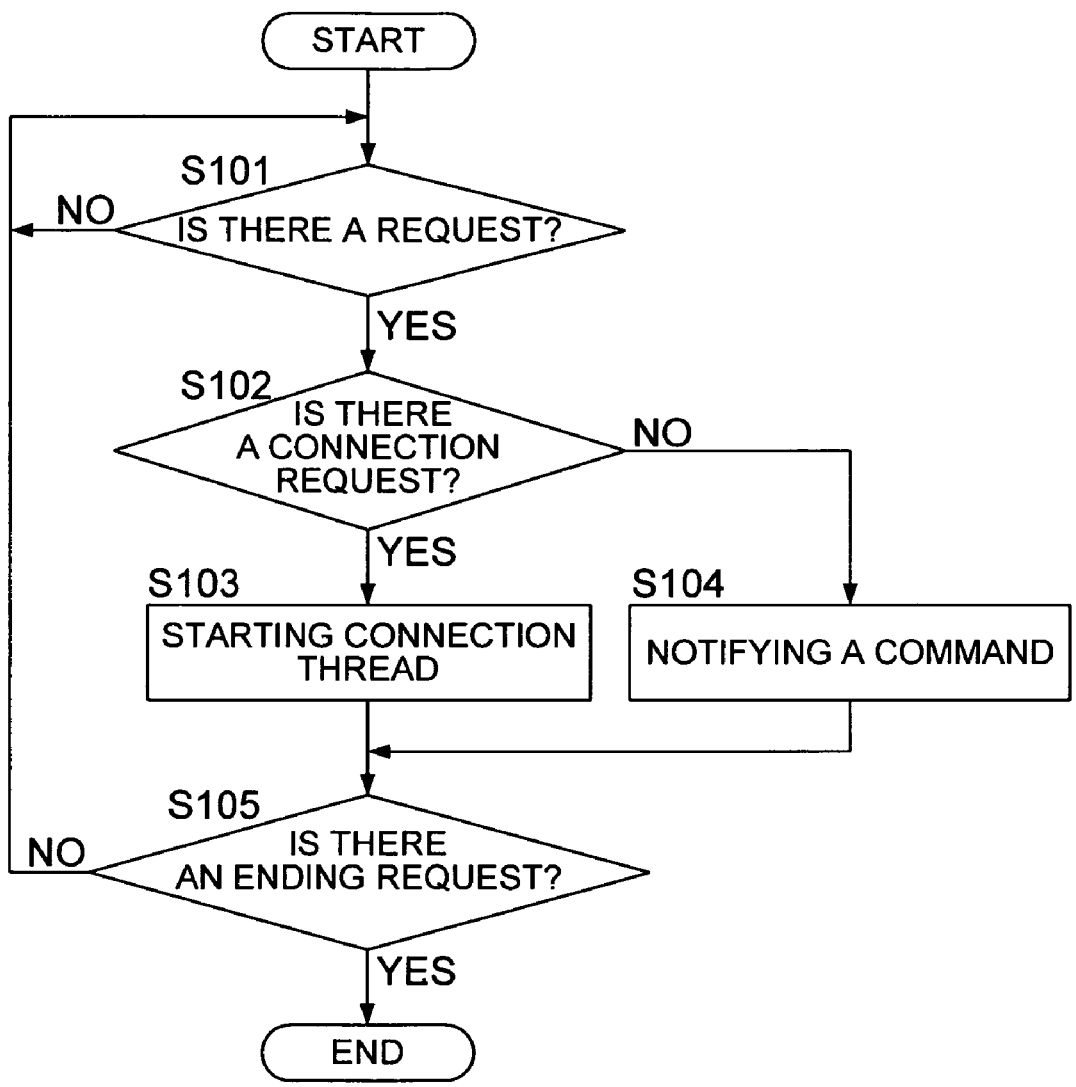
FIG. 3 illustrates a flowchart showing an operation of a reception thread of a printer controller.

FIG. 3 illustrates a flowchart showing an operation of the reception thread 13. Upon the reception thread 13 is activated, the reception thread 13 monitors whether the HTTP request is transmitted from the client 30 or not (STEP S101). If there is a request (HTTP request) from the client 30 (STEP S101: YES), the reception thread 13 determines whether the request is a connection request or a command (STEP S102). If the request is determined to be a connection request, the connection thread 16 is booted (STEP S103). On the other hand, if the request is determined to be a command (STEP S102: NO), the reception thread 13 notifies the job control section 12 of the command (STEP S104).

If there is an ending request to the reception thread 13 itself at the end of the loop, the operation of the reception thread 13 will end (END). if there is no ending request (STEP S105: NO), the reception thread 13 returns to the STEP S101 and conducts the same process thereafter. Further, the ending request is a command to prompt an end to the printer controller program 11.

Figure 4:
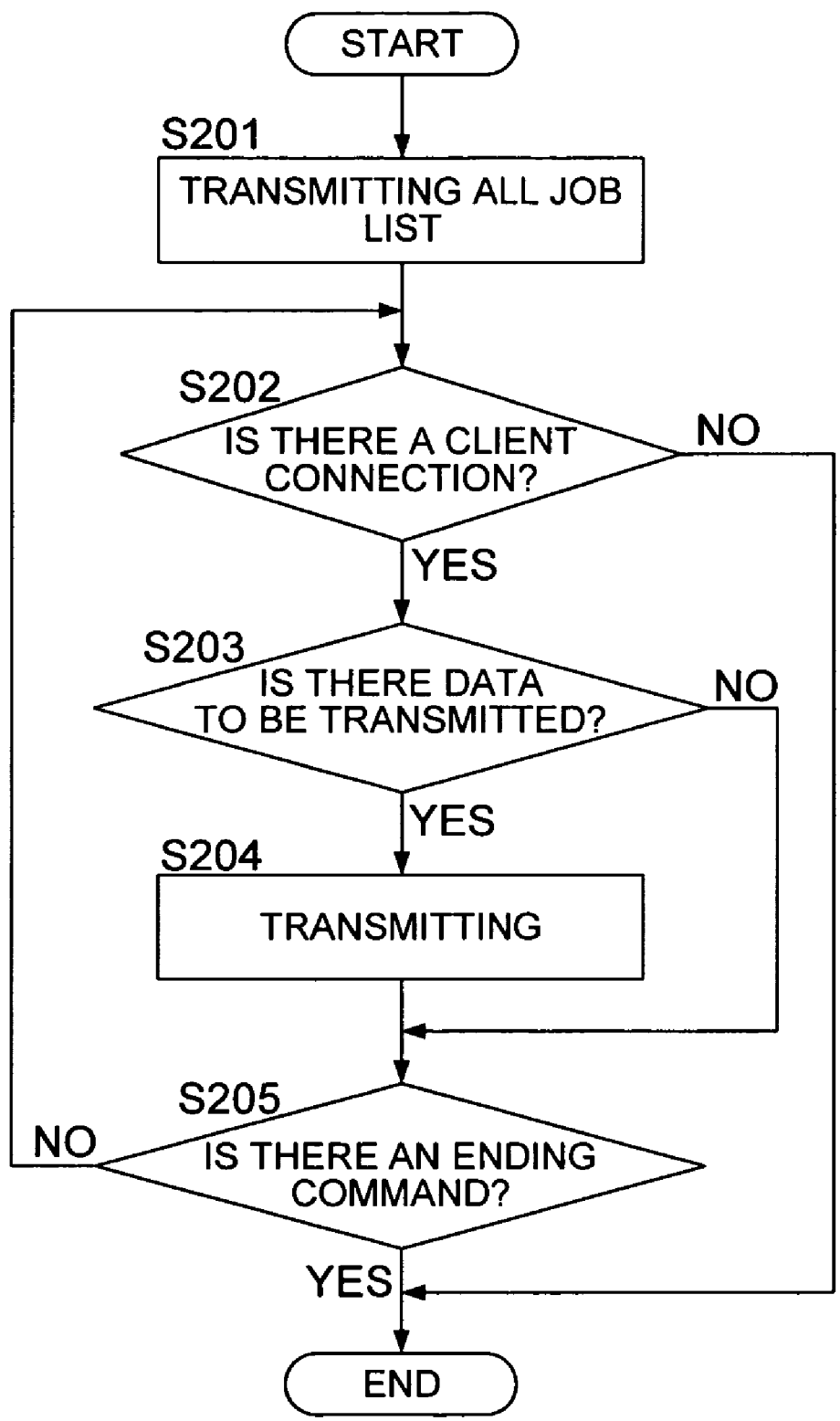
FIG. 4 illustrates a flowchart showing an operation of a connection thread of a printer controller.

FIG. 4 illustrates a flowchart showing an operation of the connection thread 16. The connection thread 16 is started up by the reception thread 13 and communicates with specified client 30 in one-to-one fashion. The connection thread 16 receives all job list (a list of all jobs) from the job control section 12 at the time when the connection thread 16 is booted, and transmits the all job list to the client 30 (STEP S201). The job list is a list of information relating to jobs contained in the printer controller program 11.

Afterwards, the connection thread 16 monitors a connection between the client 30 and if the connection is terminated from the client 30 (STEP S202: NO), the connection thread 16 ends by itself (END). If the connection is available from the client 30 (STEP S202: YES), the connection thread 16 confirms if there is data in transmission data queue 14 (STEP S203), and if there is data (STEP S203: YES) the connection thread 16 takes out the data from the transmission data queue 14 and sends to the client 30 (STEP S204).

If there is an ending command to the connection thread 16 itself at the end of the loop (STEP S205: YES), the operation of the connection thread 16 ends (END). If there is no ending command (STEP S205: NO), the operation returns to STEP S202 and the same process will be conducted thereafter.

Further, the job list is created based on the job information stored in the job queue controlled by the job control section 12. The job information is stored in the job queue with an internal code. The job list is a list having the job information of the job queue converted into the XML (extensible Markup Language) document, whose example is shown below.

Two completed jobs are registered to the job list exemplary illustrated below.

```
<JobList>
  <Job>
    <Queueid>Done</Queueid>
    <Jobid>1</Jobid>
    <Jobname>hoge</Jobname>
    <Jobowner>vpprotarou</Jobowner>
    <Jobkind>Print</Jobkind>
    <Numofcopy>1</Numofcopy>
    <Jobreceivedtime>2006/07/05/16:05</Jobreceivedtime>
    <Ripstatus>Done</Ripstatus>
    <Rippedpages>10</Rippedpages>
    <Ripendtime>2006/07/05/16/05</Ripendtime>
    <Transferstatus>Done</Transferstatus>
    <Transferredpages>0</Transferredpages>
    <Transferendtime>2006/07/05/16/05</Transferendtime>
    <Printstatus>Done</Printstatus>
    <PrintedPages>0</PrintedPages>
    <Printendtime>2006/07/05/16/05</Printendtime>
    <Ripdata>Yes</Ripdata>
  </Job>
  <Job>
    <Queueid>Done</Queueid>
    <Jobid>2</Jobid>
    <Jobname>hoge</Jobname>
    <Jobowner>vpprotarou</Jobowner>
    <Jobkind>Print</Jobkind>
    <Numofcopy>1</Numofcopy>
    <Jobreceivedtime>2006/07/05/16/05</Jobreceivedtime>
    <Ripstatus>Done</Ripstatus>
    <Rippedpages>10</Rippedpages>
    <Ripendtime>2006/07/05/16/05</Ripendtime>
    <Transferstatus>Done</Transferstatus>
    <Transferredpages>0</Transferredpages>
    <Transferendtime>2006/07/05/16/05</Transferendtime>
    <Printstatus>Done</Printstatus>
    <PrintedPages>0</PrintedPages>
    <Printendtime>2006/07/05/16/05</Printendtime>
    <Ripdata>Yes</Ripdata>
  </Job></JobList>
```

Figure 5:
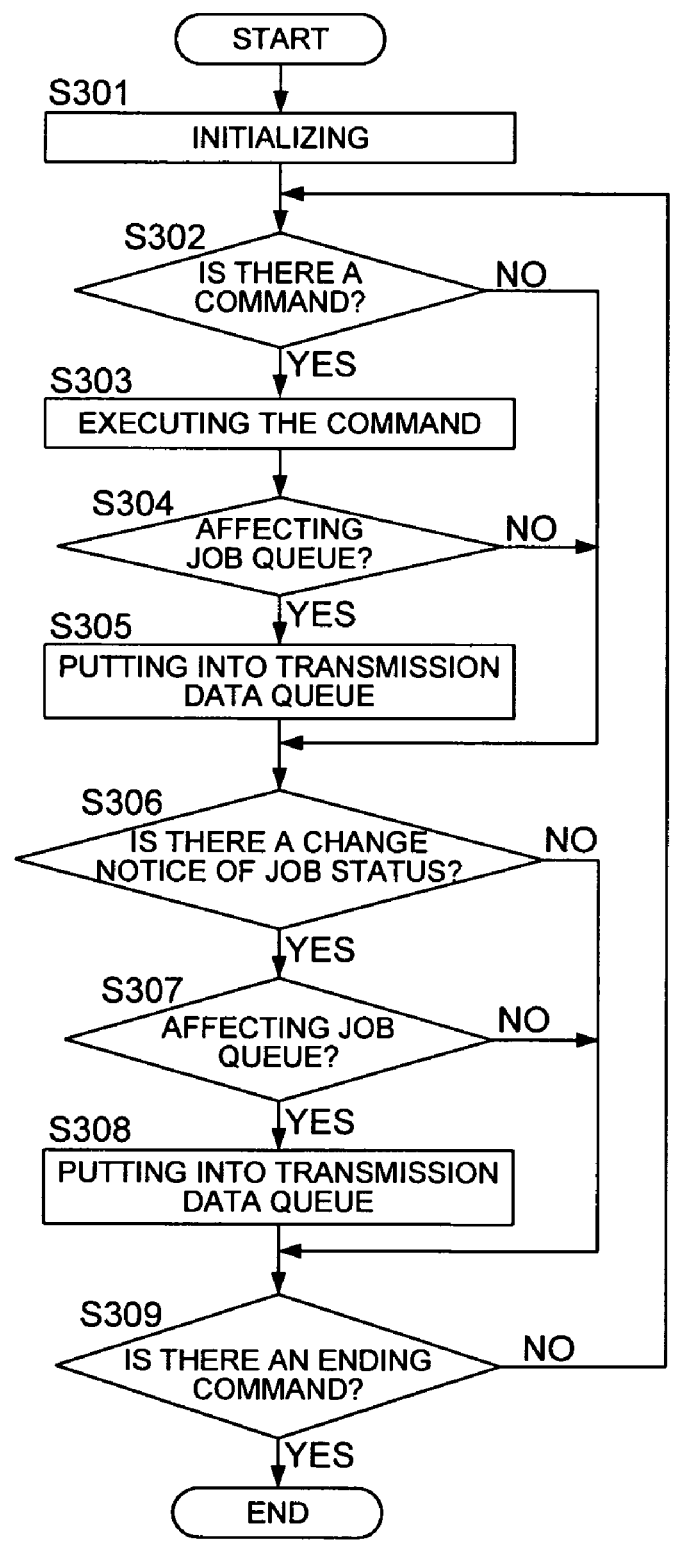
FIG. 5 illustrates a flowchart showing an operation of a job control section of a printer controller.

FIG. 5 illustrates a flowchart showing an operation of the job control section 12. The job control section 12 generates the reception thread 13 at an initialization (STEP S301). The job control section 12 determines whether there is a command from the reception thread 13 or not (STEP S302), if there is a command (STEP S302: YES), the command is executed (STEP S303). The job control section 12 determines whether the executed command will affect the job queue or not (STEP S304) and enters the information of the changes to the transmission data queue 14 (STEP S305). A command affecting the job queue, for example, is a command directing a job submission, a job deletion and a job pause.

Further, the job control section 12 determines whether there is a notification from the job processing section 15 or not (STEP S306). If there is a notification (STEP S306: YES), whether the notification contents will effect the job queue or not is determined (STEP S307). If there is an effect to the job queue (STEP 307: YES), the information of the change is submitted to the transmission data queue 14 (STEP S308). The notification affecting the job queue, for example, are how far the RIP has progressed, how many pages have been printed and whether an error has occurred.

If there is an ending command to the job control section 12 itself at the end of the loop (STEP S309: YES), the operation of the job control section 12 ends (END). If there is no ending command (STEP S309: NO), the operation returns to STEP S302 and the same process is conducted thereafter.

In STEP S305 and STEP S308 mentioned above, the data entered to the transmission data queue 14 is information of a change. Namely, differential data of a content of the job queue before and after the change is shown in the form of the job list.

For example, if the command executed in STEP S305 in FIG. 5 is a new job submission, data implying to add job to the job list is submitted to the transmission data queue 14. The example shows a case that a job of ID 3 is added to the job queue.

```
<AddJob>
  <Job>
    <Queueid>Wait</Queueid>
    <Jobid>3</Jobid>
    <Jobname>hoge</Jobname>
    <Jobowner>vpprotarou</Jobowner>
    <Jobkind>Print</Jobkind>
    <Numofcopy>1</Numofcopy>
    <Jobreceivedtime>2006/07/05/16/05</Jobreceivedtime>
    <Ripstatus>Wait</Ripstatus>
    <Rippedpages>0</Rippedpages>
    <Ripendtime/>
    <Transferstatus/>
    <Transferredpages/>
    <Transferendtime/>
    <Printstatus>Wait</Printstatus>
    <PrintedPages>0</PrintedPages>
    <Printendtime/>
    <Ripdata>No</Ripdata>
  </Job></AddJob>
```

Further, in case when the notification received from the job processing section 15 in STEP S306 of FIG. 5 states that the RIP has progressed one page, the data showing that the number of RIPed page has changed are inputted to the transmission data queue 14. This example shows that the raster image processed page of the job of the job ID 3 has progressed to page "1".

```
<JobEdit>
  <Queueid>Wait</Queueid>
  <Jobid>3</Jobid>
  <Ripstatus>Processing</Ripstatus>
  <Rippedpages>1</Rippedpages></JobEdit>
```

By submitting only the differential data to the transmission data queue 14 in this way, the differential data is transmitted to the client 30. Comparing to a case where transmitting all job list to the client 30 every time, the transmitted data volume can be reduced. Further, a process load of the printer controller 10 and of the client 30 and a traffic load of the network can be reduced.

Further, it is not necessary that the data transmitted is to be in the XML format. As long as it is a binary data, such as CSV (Comma Separated Values) format, the data format may be any other format.

Figure 6:
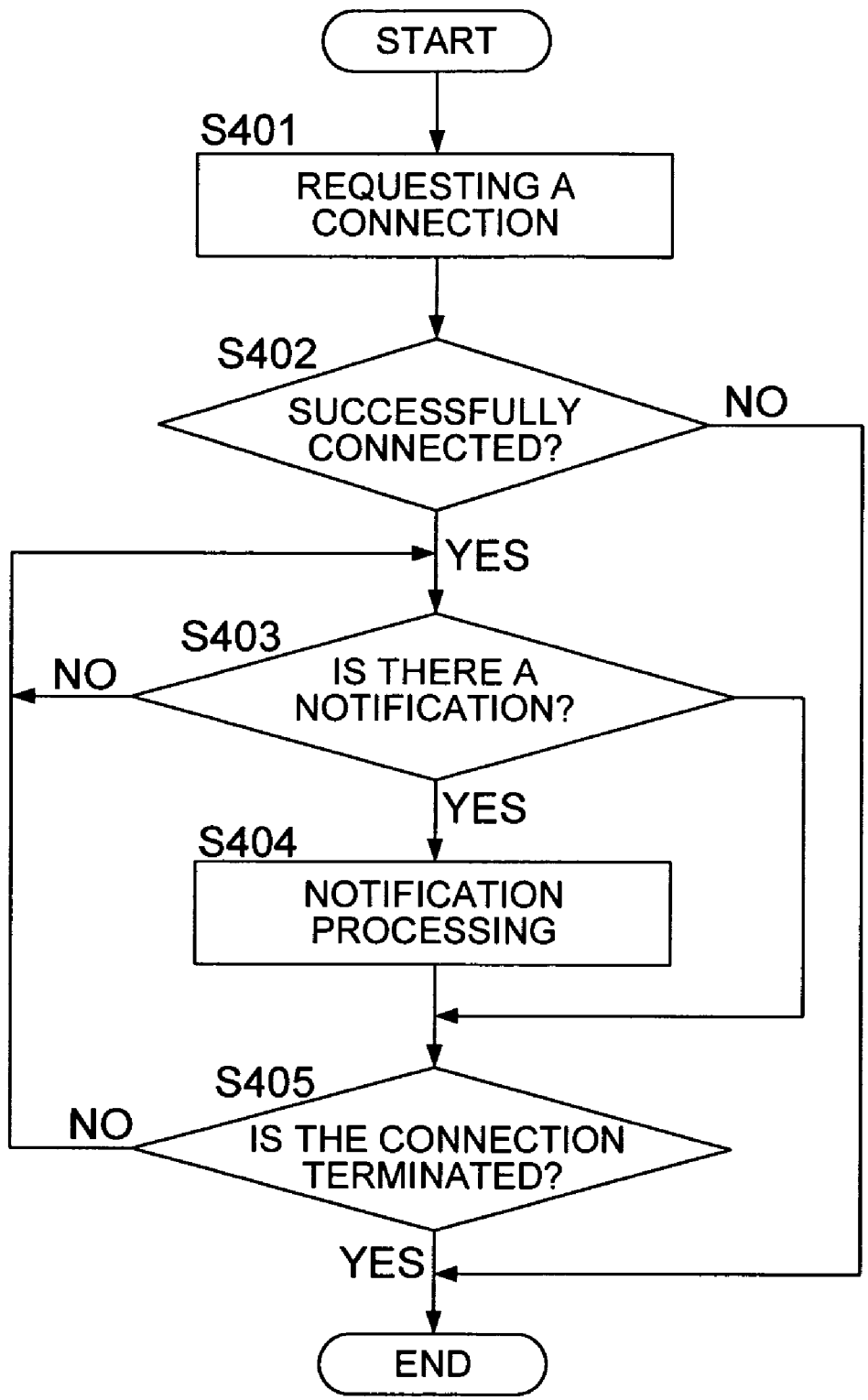
FIG. 6 illustrates a flowchart of an operation of a client application.

FIG. 6 illustrates a flowchart of an operation of the client application 31. The client application 31 conducts a connection request to the printer controller program 11 (STEP S401). After transmitting the connection request, it is determined whether the connection has succeeded or not (STEP S402). If the connection has not succeeded (STEP S402: NO), the process ends (END).

If the connection has succeeded (STEP S402: YES), the client application 31 waits for data to be transmitted from the connection thread 16 (STEP S403: NO). If the data has been transmitted from the connection thread 16 (STEP S403: YES), a notification processing is conducted (STEP S404). A job list is displayed on the display screen of the client 30 according to the data transmitted from the connection thread 16 and the contents of the displayed job list is renewed in the notification processing.

Afterwards, the client application 31 determines a status of connection with the connection thread 16 (STEP S405). If the connection is in normal status (STEP 5405: NO), the client application 31 returns to STEP S403 and the same process is conducted thereafter. If the connection has been terminated (STEP S405: YES), the process ends (END).

Figure 7:
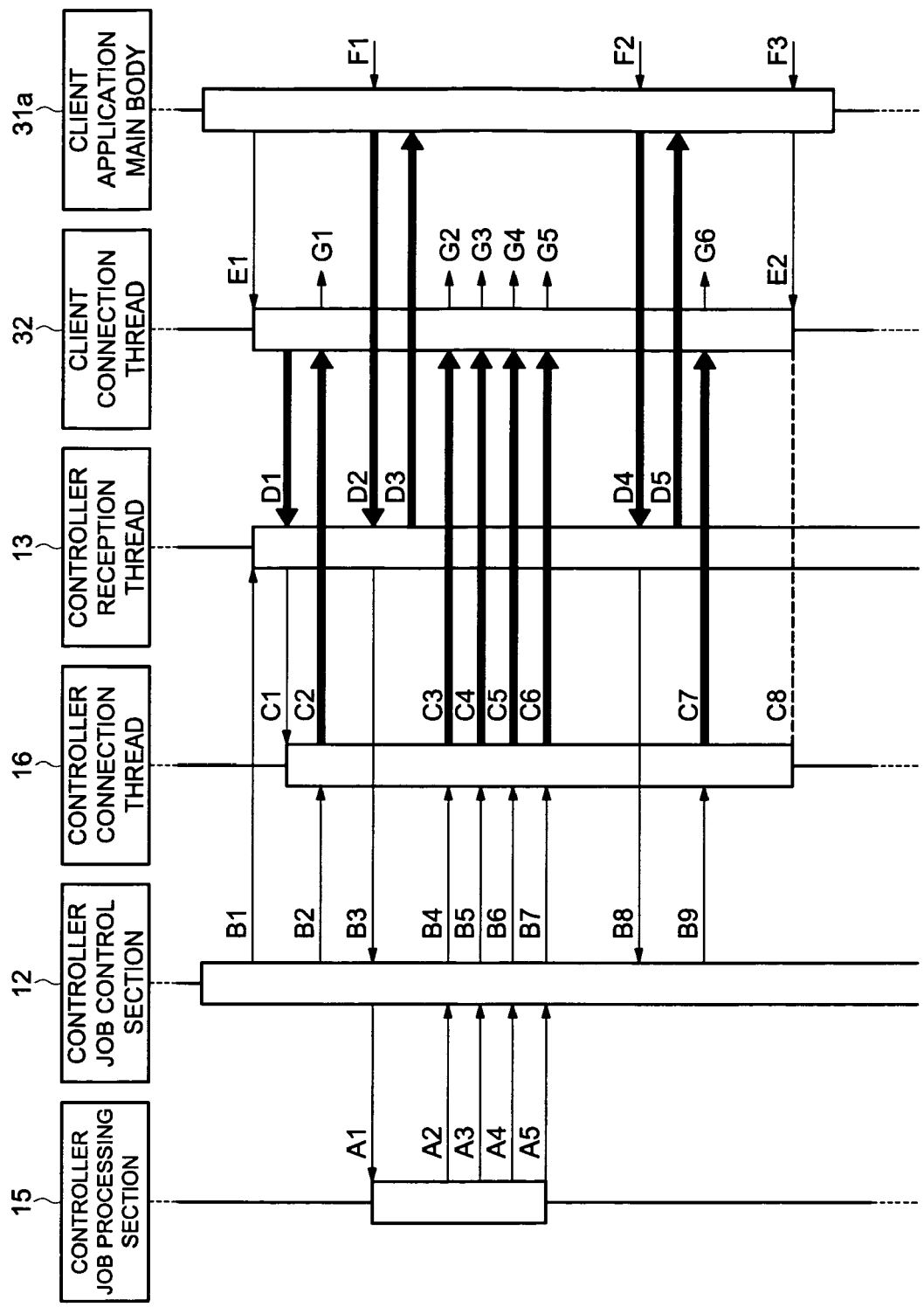
FIG. 7 is an illustration explaining an example of an operation sequence of a server client system.

Next, the operation sequence in the entire server-client system 5 will be described based on FIG. 7. The example in FIG. 7 shows the operation flow of (1) starting up the printer controller 10 and the client application 31, (2) connecting the printer controller 10 with the client application 31, (3) submitting a job from the client application 31 (F1), (4) after completing the job, deleting the job (F2), and (5) finishing the client application 31 (F3). In FIG. 7, the operation pertaining to the HTTP communication will be illustrated with arrows in bold. Among those, the communication by the chunked transfer coding is D1 (HTTP request), C2, C3, C4, C5, C6 and C7 (HTTP response, chunk formatted).

The sequence illustrated in FIG. 7 will be described in detail hereinafter.

<1> Start up of Printer Controller 10

The printer controller program 11 starts up a job control section 12 and the job control section 12 starts up the reception thread 13 (B1).

<2> Start up and Connection Execution of Client 30

The client application 31 starts up a client connection thread 32 (E1) if the client application main body 31a starts up. Then, the client application 31 executes a connection request to the reception thread 13 in the printer controller 10 (D1).

<3> Start up of Connection Thread and Start of Chunked Data Transmission

The reception thread 13 of the printer controller 10 receives the connection request (D1) and starts up the connection thread 16 (C1). The connection thread 16 of the printer controller 10 receives a job list (B2) from the job control section 12 through the transmission data queue 14 (omitted in FIG. 7) after the start up and transmits the job list to the client connection thread 32 (C2). Here, since this is the first response to the connection request, all job lists will be transmitted. The client connection thread 32 stores the received job lists from the printer controller 10 in the internal memory and at the same time, displays the job list onto the GUI (Graphical User Interface) of a liquid crystal display in the client 30 (G1).

<4> Job Submission from Client Application 31

After the connection is completed, a job will be submitted at an arbitrary timing based on a user's decision (F1). For example, the job is submitted by depressing the job submission button (not shown) of the client application 31.

The client application main body 31a transmits a new job submission command against the reception thread 13 of the printer controller 10 (D2). The reception thread 13 having received this job submission command returns a response of the command regardless of the job submission being successful or unsuccessful (D3). In this example, the reception thread 13 returns a response indicating the command reception being successful. Meanwhile, if there is abnormality in a parameter in the job submission command, or if there is a command from a user, who is not allowed to conduct an operation, a response indicating failure will be returned.

The reception thread 13 of the printer controller 10, which has received the job submission command from the client connection thread 32, relays the job submission command (D2) to the job control section 12 (B3).

If the job control section 12 receives the job submission command, the job control section 12 starts up the job processing section 15 and inputs the job to the job processing section 15 (A1). Based on this operation, the job processing section 15 starts a process pertaining to the job.

The job processing section 15 having started the processing successively notifies the progressing information to the job control section 12 (A2, A3, A4 and A5). In the example illustrated in FIG. 7, for the purpose of simplification, a notification A2 is to indicate the RIP completion of the first sheet, a notification A3 is to indicate the RIP completion of the second sheet, a notification A4 is to indicate the RIP completion of the third sheet and a notification A5 is to indicate the job completion.

The job control section 12 having received respective notifications (A2, A3, A4 and A5) relays the notifications one by one to the reception thread 13 by inputting the notifications to the transmission data queue 14 (B4, B5, B6 and B7).

The connection thread 16 having received respective notifications (B4, B5, B6 and B7) forms the notifications into chunked data one by one and transmits the chunked data to the client connection thread 32 (C3, C4, C5 and C6).

The client connection thread 32 successively receives the chunked data, updates the job list in the internal memory according to the contents of the data and displays the updated job list onto the GUI (G2, G3, G4 and G5).

<5> Execution of Deleting Job After the Job Completion

After completion of a job, the instruction for deleing the job of job ID: 2 is received (F2) at an arbitrary timing based on a user's intention. For example, the instruction for deleing the job is received, if the job deleting button (not shown) of the client application 31 is depressed under the condition that the job ID: 2 is specified.

The client application main body 31a transmits the job deleting command to the reception thread 13 of the printer controller 10 (D4). The reception thread 13 of the printer controller 10 returns the response corresponding to the command (D5) and at the same time, relays the job deleting command to the job control section 12 (B8).

The job control section 12, which has received the job deleting command, deletes the job and notifies the connection thread 16 of the information that this job has been deleted from the job list via the transmission data queue 14 (B9).

The connection thread 16, which has received this notification (B9), transmits the chunked data of job deletion information to the client connection thread 32 (C7).

The client connection thread 32, which has received the chunked data, deletes the corresponding job from the job list, which is stored in the internal memory, and displays the job list, from which the corresponding job has been deleted, on the GUI and updates the display contents (G6).

<6> Finish Client Application 31 (F3)

There are two patterns for finishing methods.

[Pattern 1] Termination from Client

After the job deletion, a user depresses a finish button (not shown) of the client application 31 at an arbitrary timing based on user's intention (F3). The client application main body 31a instructs the client connection thread 32 to finish the job when the client application main body 31a receives a depression operation of the finish button by the user (E2). The client connection thread 32 receives this instruction and terminates the connection between the connection thread 16 of the printer controller 10 (C8). The connection thread 16 of the printer controller 10, which has detected the termination, determines that this termination is a signal of the communication finish and turns off the connection thread 16 itself.

[Pattern 2] Termination from Server

The case when terminating the communication due to a cause in the printer controller 10 side corresponds to the pattern 2. The pattern 2 is not shown in FIG. 7. In the case of the termination of the pattern 2, as defined in the RFC, the chunked data having a size 0 (zero) is transferred to the client connection thread 32. In the case when the client connection thread 32 has received the chunked data having a size 0 (zero), the client connection thread 32 recognizes this chunk as a signal of ending of the communication and conducts a finishing process, such as, notifying a user that the server is not under service.

As described above, since the printer controller 10 of the embodiment utilizes the chunked transfer coding and continues to keep the connection status in case when notifying the client of the job status, the job list matching between the printer controller 10 (server) and the client 30 can be kept with minimum data, mechanisms and operations. Further, since the printer controller 10 of the embodiment continues to keep the connection status in case when notifying the client of the job statuses, it is not necessary to reconnect the communication. Thus, the overhead for the connection is reduced and swiftly transmits the data to the client.

Further, since the printer controller 10 notifies the client 30 of the contents of a change in chunked data at the timing when the change occurs in the job list, the time delay can be minimized, and the job list matching between the printer controller 10 side and the client 30 side can be improved. Further, since only the differential portion of the change is transmitted, it is possible to reduce the communication data capacity.

Figure 8:
FIG. 8 illustrates an example of a job list display screen shown to a client.

FIG. 8 illustrates an example of the job list screen 40 being displayed on the client 30. In the job list screen 40, for each job, the contents of information of corresponding job, such as a job status, a number of printed pages, a job ID, a job name, user name and a job received time are listed in a row with being in association with each other. As the response to the connection request, for every reception of the chunked data from the printer controller 10, the display contents of the job list screen 40 is updated according to the data contents.

Figure 9:
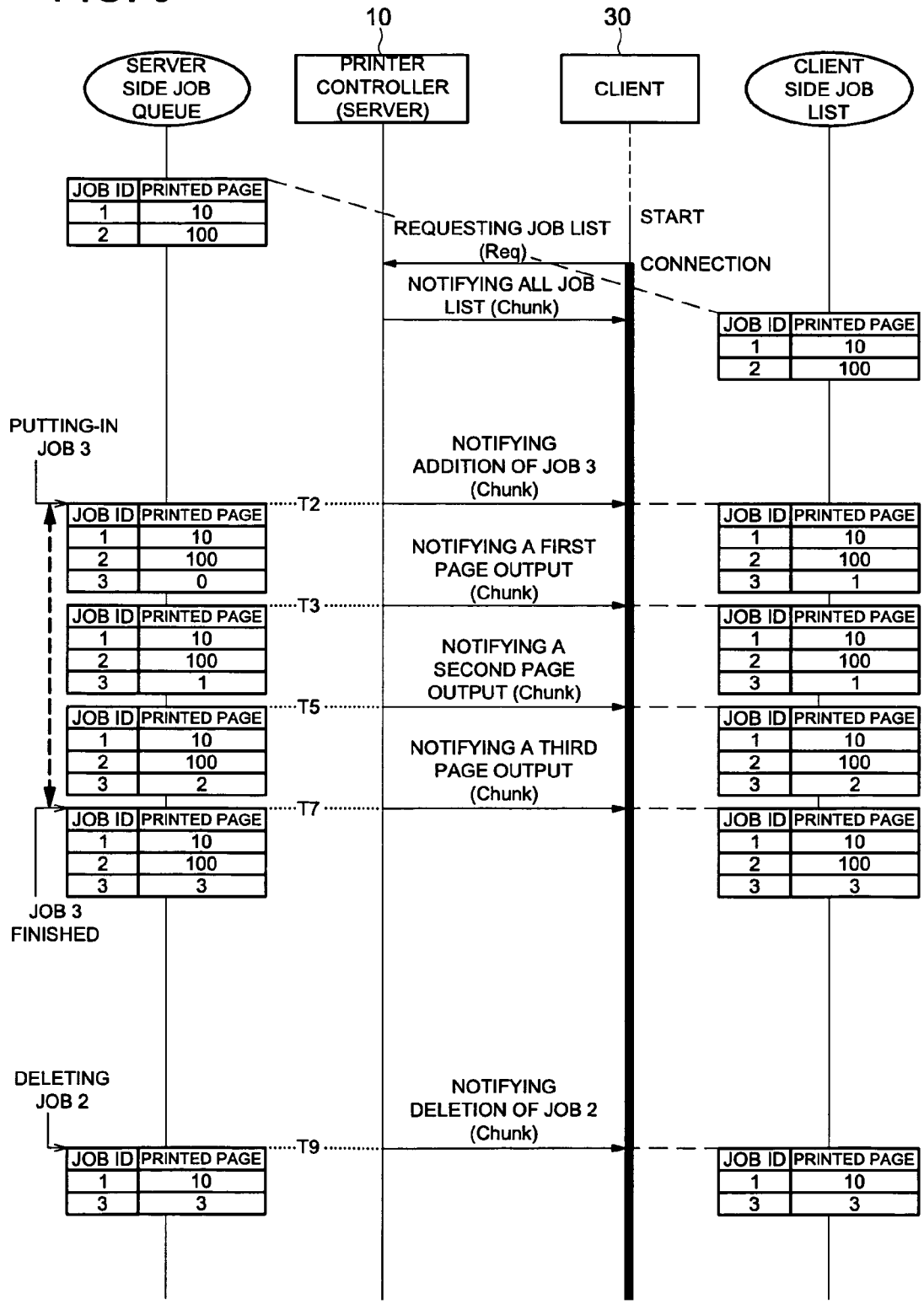
FIG. 9 is an illustration explaining an example of transition of a display status of a job list and a communication protocol in case of a job list notification to a client from a printer controller pertaining to an embodiment of the present invention.
Figure 10:
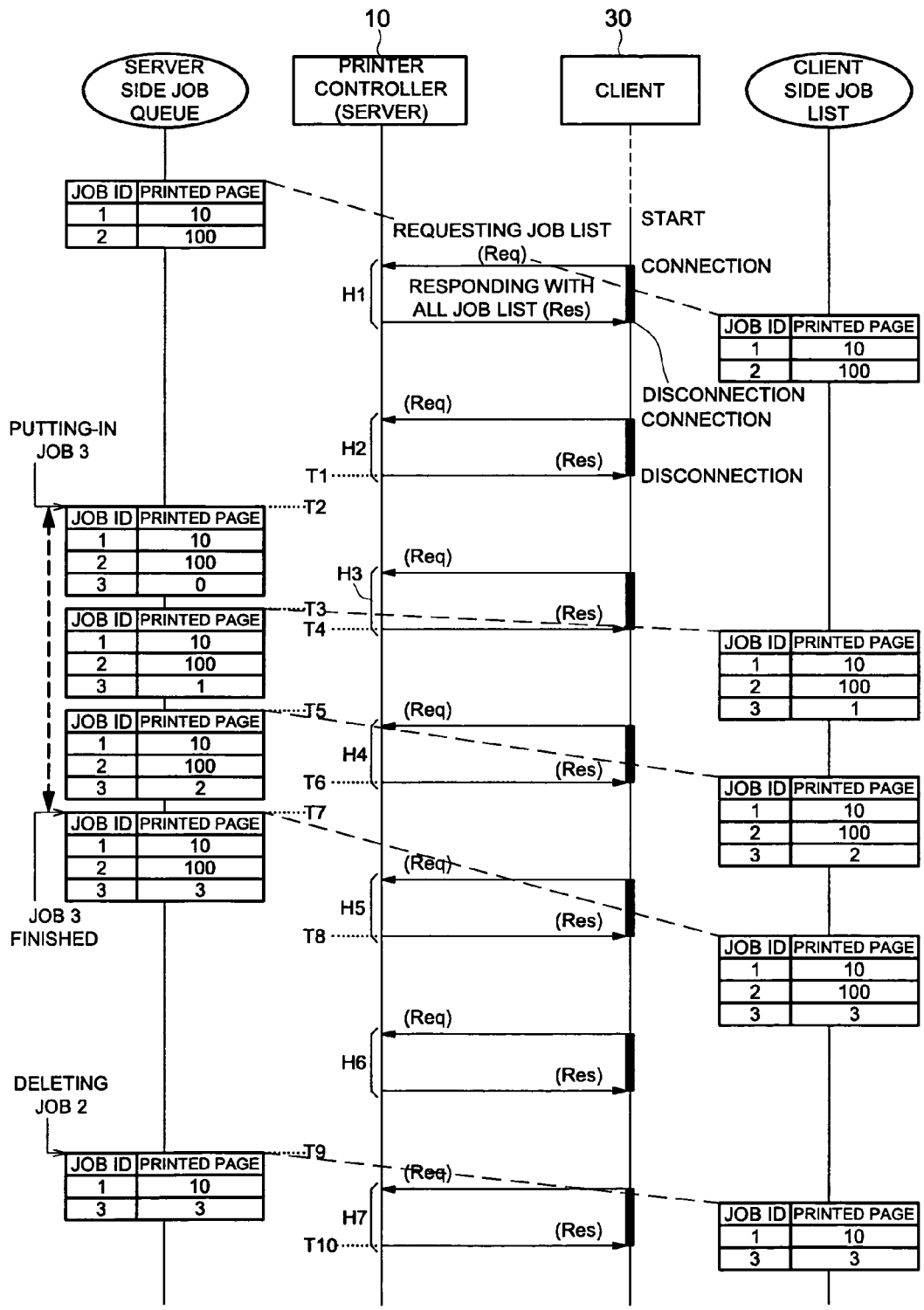
FIG. 10 is an illustration explaining an example of a transition of a display status of a job list and a communication protocol in case of a job list notification to a client from a printer controller of prior art.

FIG. 9 illustrates the communication protocol and the display status transition of the job list when the client server system 5 in the embodiment notifies the client 30 of the job list transition in the printer controller side, which is the same as the one illustrated in FIG. 10, from the printer controller 10. Since the printer controller 10 of the embodiment transmits the changed contents in a form of chunked data when the job status changes, communication is simpler and the communication quantity is reduced comparing with the one illustrated in FIG. 10.

Further, since when the job list content in the printer controller 10 changes, the changed content is notified to the client 30 in a form of chunked data at that timing, the job list change in the printer controller 10 side is reflected on the job list in the client 30 side with a extremely small time delay and the job list contents for controlling jobs in both sides are swiftly matched.

Exemplary embodiments of the present invention have been described by using drawings. However, the present invention is not limited to the above embodiments and various changes and additions may be made without departing from the scope of the invention.

For example, in case of displaying the job list by utilizing Web browser in the client 30 side, normally, Ajax (Asynchronous Javascript+XML (Java is a registered trademark)) is used. However, Ajax might happen to link received data.

Therefore, the chunked data may be equipped with a mechanism for dividing the chunked data themselves afterwards. More specifically, in case when transmitting data "ABC", a unique header/footer definitely not included in the data may be added. For example, <H> is defined as a header/footer, and <H> ABC<H> as data may be transmitted. By apply this idea to the data formation, in case when the data is linked as <H> 123<H><H> ABC<H><H> 789<H>, these data may be utilized by dividing them.

Here, Ajax denotes a development method of Web applications having a function for rewriting a necessary portion of the page by utilizing a dynamic HTML by communicating with a server while asynchronously reading the entire page by utilizing XMLHttpRequest object in JavaScript.

Other than this, in the embodiments, the report (notification) pertaining to the monitoring object as a response to the connection request from the client 30 is to be formed in chunked transfer coding by setting the job status of the printer controller 10 as the monitoring object. However, the monitoring object is not limited to this. The monitoring object may be any monitoring object as far as the object changes as time elapses. For example, the monitoring object may be the fluctuation of the stock values of 1000 stocks, the heart beat of a pilot of a jet fighter, a number of rotation of a nuclear reactor cooling pump or attitude information of a spaceship.

In the embodiments, the differential data of the change is transmitted to the client 30 in a chunk. However, the entire job list may be transmitted every time.

The display of the job list in the client 30 is not limited to a Web browser. A dedicated application may be used to display the job list.

What is claimed is:

1. An HTTP server comprising: a communication section which communicates with a client, and a control section which, as a response to an HTTP request for requesting reports pertaining to a monitoring object received from the client via the communication section, transmits the reports via the communication section to the client by making the reports with chunked data in chunked transfer coding when changes occur to the monitoring object.

2. The HTTP server of claim 1, each report is formed with information indicating a difference between a previous status of the monitoring object, which has already been reported to the client, and a current status of the monitoring object.

3. The HTTP server of claim 1, wherein a unique header and a unique footer are added to the chunked data to be transmitted to the client.

4. The HTTP server of claim 1, wherein the change of the monitoring object is either one of a status change of a printing apparatus or a job state change of the printing apparatus.

5. A nontransitory computer readable recording medium recorded thereon a program which allows a server to function as an HTTP server performing the steps of: receiving an HTTP request for requesting reports pertaining to a monitoring object from a client; and transmitting the reports, as a response to the HTTP request, to the client by making the reports with chunked data in chunked transfer coding when changes occur to the monitoring object.

6. The nontransitory computer readable recording medium of claim 5, wherein the report is formed with information indicating difference between a previous status of the monitoring object, which has already been reported to the client, and a current status of the monitoring object.

7. The nontransitory computer readable recording medium of claim 5, wherein a unique header and a unique footer are added to the chunked data to be transmitted to the client.

8. The nontransitory computer readable recording medium of claim 5, wherein the change of the monitoring object is either one of a status change of a printing apparatus or a job state change of the printing apparatus.

* * * * *